Figure 1:
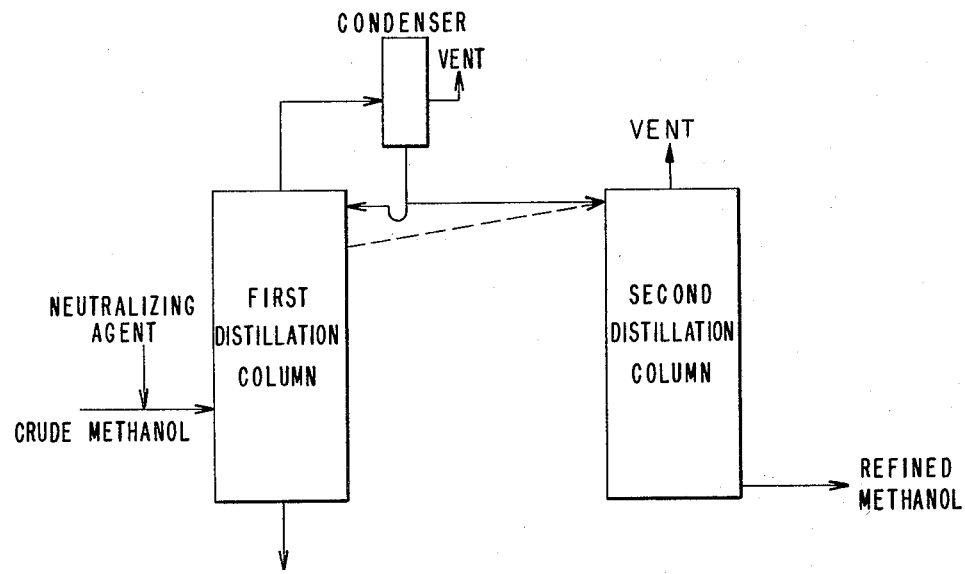

Nov. 1, 1966     W. E. CLARK     3,282,802

PROCESS FOR REFINING METHANOL

Filed Dec. 27, 1962

INVENTOR

WILLIAM E. CLARK

BY *John E. Griffiths*

ATTORNEY

United States Patent Office 3,282,802
Patented Nov. 1, 1966

3,282,802
PROCESS FOR REFINING METHANOL
William E. Clark, Charleston, W. Va., assignor to E. I. du Pont de Nemours and Company, Wilmington, Del., a corporation of Delaware
Filed Dec. 27, 1962, Ser. No. 247,563
4 Claims. (Cl. 203—82)

This invention relates to an improved process for refining crude methanol.

Figure 2:
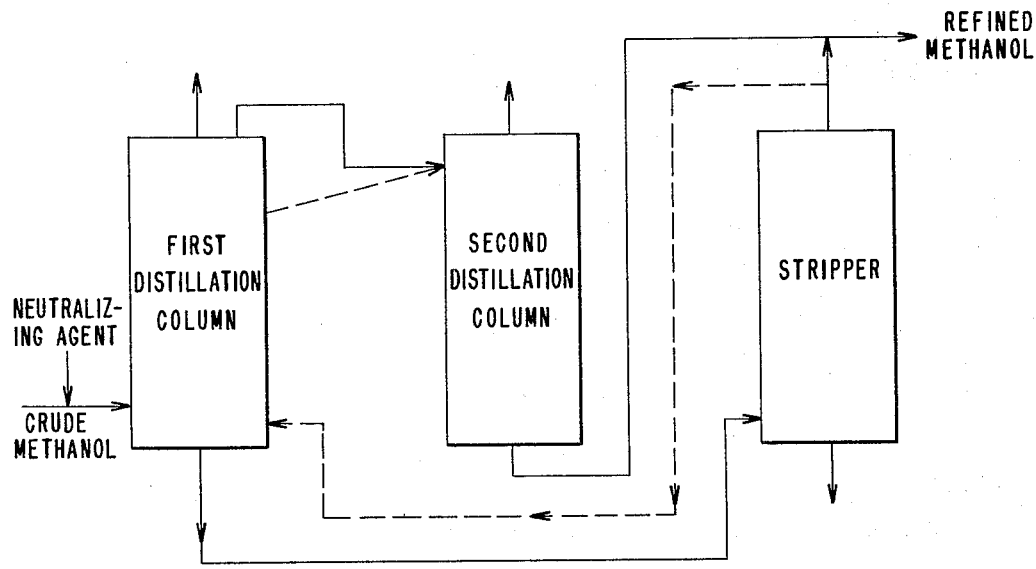

In the drawings:

FIGURE 1 is a diagrammatic sketch of distillation apparatus suitable for carrying out the present invention; and FIGURE 2 is a diagrammatic sketch of a preferred arrangement of apparatus useful in the present invention.

Crude methanol is generally composed of from about 93% to 98% by weight methanol, with the remainder of the crude being small but highly objectionable amounts of materials having boiling points above or below that of pure methanol. The high boilers, as they are called, ordinarily constitute from about 1 to 3% by weight of the crude and are principally water with small amounts, i.e. 0.2 or 0.3 or so of higher alcohols such as ethanol, propanol and isobutanol. The low boilers, as they are called, ordinarily constitute from about 1 to 4% and are principally dimethyl ether with small amounts of methyl formate and acetone.

Crude methanol is ordinarily refined by distillation procedures in which the purified methanol after a number of distillation steps is obtained overhead as a gas which must be condensed and recovered. In an alternative method, crude methanol can be purified to some extent by ion exchange treatment.

The process of the present invention gives refined methanol of outstanding purity. In standard tests for measuring purity, the product exhibits permanganate oxidation times as high as 85 or 90 minutes and even higher compared with times significantly lower for conventional processes. In addition the present process surprisingly allows the elimination of distillation equipment heretofore considered essential for commercial methanol refinement by distillation procedures.

The process of this invention comprises introducing crude methanol into the bottom half portion of a first distillation column, withdrawing a bottoms liquid stream containing high boilers, venting overhead vaporized low boilers, wtihdrawing a purified methanol stream as a vapor or liquid from the top portion of the column, introducing this methanol stream into the top half portion of a second distillation column, providing an overhead vent-off for vapor exit, and withdrawing from the bottom portion of this second column a liquid stream of highly pure refined methanol.

It has been found that this liquid product stream surprisingly is exceptionally pure and does not contain any appreciable amount of undesired components such as oxidizable impurities, higher alcohols, amines, dirt, packing or the like, as one might normally expect from a distillation column bottom stream in such an operation.

Furthermore, the methanol purified by the process of this invention has markedly reduced acidity and reduced contamination with volatile base materials, without loss in other desired properties such as good color characteristics, low water content and low level of carbonizable substances.

The outstanding efficiency of my process, compared with prior refining of crude methanol and even successive or repetitive refining operations for crude methanol, is based on the discovery that when high boilers are removed from the crude methanol before the low boilers are removed further degradation or decomposition of high boilers to produce low boilers is precluded in the refined product.

The crude methanol can be that obtained by conventional methods such as by the catalyzed reaction of hydrogen and carbon monoxide under pressure.

With reference to FIGURE 1, the crude is fed in a liquid stream into a distillation column of desired capacity. A convenient neutralizing agent such as phosphoric acid, sulfuric acid, or the like can also be added if needed. Alternatively a neutralizing ion exchange resin can be used as will be readily understood. Usually only a very small amount of neutralizing agent will be required. From 2 to 200, and ordinarily from 5 to 20, parts per million of neutralizing agent will be sufficient for most commercially produced crude methanol.

The crude feed will conveniently be at ambient conditions although a somewhat elevated temperature of say up to 40° or 50° C. is satisfactory. The feed will be into the bottom half portion of the column, i.e., in a column of 60 plates the feed inlet will be below the 30th plate. Columns of 55 to 65 plates are quite suitable for large scale operation. Distillation conditions can be maintained by external heating means, or if desired by introduction of live steam into the bottom portion of the column, or both.

In this first column low boiling components are distilled overhead while a bottoms liquid stream containing high boilers is drawn off below. The overhead stream as shown in FIGURE 1 is refluxed in a condenser and components boiling below the boiling point of methanol are vented from the system. The greatly purified methanol is tapped from the condenser bottoms as shown or, in an alternative arrangement, is tapped as a vapor or liquid entirely or in part directly from the column as shown by the dotted line in FIGURE 1. In this latter arrangement the tap will be in the upper one-sixth portion of column and preferably about one-tenth of the distance from the top to the bottom of the column.

The vapor or liquid stream is now introduced into the upper one-half portion of a second distillation column wherein substantially all of any that may still be present of components boiling at a temperature below methanol are distilled off overhead and a liquid stream of highly pure methanol is withdrawn below. This second column will suitably have from about one-fourth to one-half the number of plates as the first column. Each column can be of conventional design and for example conventional sieve plate or bubble cap construction is suitable.

In a preferred arrangement shown in FIGURE 2 feed of crude and overhead venting and removal of a methanol stream from a first distillation column, and feed of this stream into a second vented column from which refined methanol is removed as a bottom liquid stream, is generally the same as described above with respect to FIGURE 1. However, since it is possible that the liquid bottom stream from the first distillation will contain a small amount of undistilled methanol, it is highly desirable to further treat this stream to recover this methanol and thereby improve the total yield of refined methanol from the overall methanol refinement process.

The recovery of the methanol from the bottom stream from the first distillation column can be carried out by any suitable method, such as by a stripping operation to boil off methanol overhead and leave the waste tails as a bottom stream. This stripping can if desired be carried out in a common column with the distillation step in the first distillation column. If of sufficiently high quality the stripped methanol can be added to the refined methanol obtained directly from the second distillation column or, in a convenient recycle arrangement some or all can be fed back into the system, preferably into the lower one-fourth portion of the first distillation column.

It is advantageous, as shown in the preferred arrangement of FIGURE 2, when the recycle stream from the stripper top is fed back into the first refining column, to purposely include in the feed to the stripper up to about 20% of the total amount of methanol introduced into the system. Preferred operation will have from 5 to 15% of the methanol in the starting crude drawn off in the bottoms from the first distillation column and put through the stripper with stripper toppings being carried back into the first distillation column. In this arrangement superior refining occurs at more economic operating conditions and with minimum process control problems.

As an example illustrating one mode of operation according to this invention and using apparatus as shown in FIGURE 1, methanol crude from a hydrogen-carbon monoxide synthesis process and being from about 90% to 98% or more by weight of $CH_3OH$ is introduced into a sieve plate distillation column having 60 plates at about the 15th plate from the bottom. Ten parts per million of neutralizing acid is added to the crude. The crude at a temperature of 40° C. is fed at a rate of 6,200 gallons per hour; the reflux ratio is 1.3 average; the base temperature of the column is 105° C.; the base pressure is 165 inches of water above atmospheric pressure; and the vent temperature is 58° C. Vapor or liquid stream is fed to the second column, which is a 20 plate sieve plate column, also at its 16th plate from the bottom. Reflux ratio is 0.2 average and vent temperature is 35° C. In this operation the crude had an Allen No. of 9, which is a standard measure of permanganate oxidation time, or P.O.T., expressed in minutes, and also had a water content of 1.8% by weight. The refined methanol coming off from the bottom of the second column had an Allen No. of 90 and analyzed for complete absence of water, chlorides and volatile bases, an acidity of less than 0.001% as acetic acid and the color produced gave a 6 A.P.H.A. for the carbonizable substances test.

In operation of the preferred arrangement of FIGURE 2, the preceding process is repeated except that the bottoms from the first column contains 10% of the $CH_3OH$ in the crude and is cycled through the stripper back into the first column at the 10th plate. Analysis of the refined methanol from the bottom of the second column shows the product is the same high quality as in the preceding example.

The invention claimed is:
1. In a process for refining crude methanol typically containing about 93 to 98% by weight methanol, 1 to 3% high boilers, some which are capable of degrading to low boiling impurities under distillation conditions, and 1 to 4% low boilers, the steps of introducing crude methanol into the bottom half portion of a first distillation column, distilling said crude methanol by withdrawing a bottom stream containing substantially all of the high boilers while withdrawing an overhead stream containing low boilers, methanol, and substantially free of high boilers, introducing said overhead stream into the upper half portion of a second distillation column, and removing overhead in said second column the low boilers while withdrawing from the bottom of this second column a liquid stream of refined methanol substantially free from oxidizable impurities and low boilers.

2. In a process for refining crude methanol typically containing about 93 to 98% by weight methanol, 1 to 3% high boilers, some which are capable of degrading to low boiling impurities under distillation conditions, and 1 to 4% low boilers, the steps of introducing crude methanol into the bottom half portion of a first distillation column, distilling said crude methanol by withdrawing a bottom stream containing substantially all of the high boilers while withdrawing an overhead stream containing low boilers, methanol, and substantially free of high boilers, removing a portion of the low boilers and introducing the remaining portion of said overhead stream into the upper half portion of a second distillation column, and removing overhead in said second column the remaining low boilers while withdrawing from the bottom of this second column a liquid stream of refined methanol substantially free from oxidizable impurities and low boilers.

3. The process as set forth in claim 2 wherein the remaining portion of said overhead stream is refluxed into the first distillation column and a stream containing methanol, low boilers, and substantially free from high boilers is withdrawn directly from said first column at an outlet in the upper one-sixth portion of said first column and introduced into the upper half portion of the second distillation column.

4. The process as set forth in claim 2 wherein said bottoms stream from said first column contains up to 20% of the total methanol in the crude introduced into said first column, and said bottoms stream is introduced into a third column where it is stripped of its methanol, the methanol from the third column then being recycled back into the lower one-fourth portion of said first column.

References Cited by the Examiner

UNITED STATES PATENTS

| | | | |
|---|---|---|---|
| 1,507,108 | 9/1924 | Cyphers | 202—41 |
| 2,351,527 | 6/1944 | Lembcke | 203—97 |
| 2,411,264 | 11/1946 | Hachmith | 202—70 X |
| 2,476,206 | 7/1949 | McCants | 202—71 X |
| 2,549,290 | 4/1951 | Congdon et al. | 203—97 |
| 2,581,789 | 1/1952 | Forman | 203—97 |
| 2,600,106 | 6/1952 | Garrett | 202—70 X |
| 2,672,434 | 3/1954 | MacFarlane | 202—40 |
| 2,751,337 | 6/1956 | Goddin et al. | 203—96 |
| 2,990,340 | 6/1961 | Barnes | 260—643 X |

OTHER REFERENCES

C. S. Robinson et al.: Elements of Fractional Distillation, New York, 1939, 3rd edition (pages 134 through 187; pages 147 and 168 specifically relied upon).

"Petroleum Refiner," vol. 38, No. 11, page 268 (1959).

NORMAN YUDKOFF, *Primary Examiner.*

WILBUR BASCOMB, JR., *Examiner.*